US009503925B2

(12) United States Patent
Jung et al.

(10) Patent No.: US 9,503,925 B2
(45) Date of Patent: Nov. 22, 2016

(54) METHOD FOR MEASURING AND REPORTING CSI-RS IN WIRELESS COMMUNICATION SYSTEM, AND APPARATUS FOR SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR); Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/416,543

(22) PCT Filed: Jul. 23, 2013

(86) PCT No.: PCT/KR2013/006598
§ 371 (c)(1),
(2) Date: Jan. 22, 2015

(87) PCT Pub. No.: WO2014/017811
PCT Pub. Date: Jan. 30, 2014

(65) Prior Publication Data
US 2015/0208266 A1 Jul. 23, 2015

Related U.S. Application Data

(60) Provisional application No. 61/674,401, filed on Jul. 23, 2012, provisional application No. 61/678,113, filed on Aug. 1, 2012, provisional application No. 61/679,077, filed on Aug. 3, 2012, provisional application No. 61/680,276, filed on Aug. 7, 2012.

(51) Int. Cl.
*H04L 1/00* (2006.01)
*H04W 24/10* (2009.01)
(Continued)

(52) U.S. Cl.
CPC ........... *H04W 24/10* (2013.01); *H04B 7/0645* (2013.01); *H04B 17/318* (2015.01);
(Continued)

(58) Field of Classification Search
CPC ... H04W 72/04; H04W 72/05; H04W 72/06; H04W 72/0446; H04W 72/0447; H04W 72/0448; H04W 52/40; H04W 52/41; H04W 52/42
USPC .......................... 370/252, 329, 334, 339, 323
See application file for complete search history.

(56) References Cited

U.S. PATENT DOCUMENTS

2009/0036116 A1  2/2009  Kim et al.
2012/0040707 A1  2/2012  Kim et al.
(Continued)

FOREIGN PATENT DOCUMENTS

WO   WO 2011/090328 A2   7/2011
WO   WO 2012/023827 A2   2/2012
WO   WO 2012/096521 A2   7/2012

OTHER PUBLICATIONS

Huawei et al., "General Framework and Principles for Configuration of CSI-RS Based Received Signal Quality Measurement," 3GPP TSG-RAN WG2 Meeting #78, R2-122135, Prague, Czech Republic, May 21-25, 2012, pp. 1-5, XP050607147.

(Continued)

*Primary Examiner* — Dady Chery
(74) *Attorney, Agent, or Firm* — Birch, Stewart, Kolasch & Birch, LLP

(57) ABSTRACT

Provided is a method for measuring and reporting a channel state information-reference signal (CSI-RS) in a wireless communication system. The method comprises: transmitting a first measurement report message, which includes at least one first CSI-RS measurement report; determining whether to report at least one second CSI-RS measurement result; and transmitting a second measurement report message, which includes the at least one second CSI-RS measurement result, when the determination is made to report the second CSI-RS measurement result. The determination of whether to report is based on a first CSI-RS trigger list, which is a list of one or more first CSI-RS resources that are related to the at least one first CSI-RS measurement result, and a second CSI-RS trigger list, which is a list of one or more second CSI-RS resources that are related to the at least one second CSI-RS measurement result.

18 Claims, 19 Drawing Sheets

(51) Int. Cl.
*H04L 5/00* (2006.01)
*H04W 24/08* (2009.01)
*H04B 17/318* (2015.01)
*H04B 17/336* (2015.01)
*H04W 72/00* (2009.01)
*H04B 7/06* (2006.01)
*H04B 7/02* (2006.01)

(52) U.S. Cl.
CPC ............. *H04B 17/336* (2015.01); *H04L 5/00* (2013.01); *H04L 5/0048* (2013.01); *H04W 24/08* (2013.01); *H04B 7/024* (2013.01); *H04B 7/0626* (2013.01); *H04W 72/00* (2013.01)

(56) References Cited

U.S. PATENT DOCUMENTS

2012/0294184 A1 11/2012 Jung et al.
2013/0039203 A1* 2/2013 Fong ...................... H04B 7/024 370/252
2013/0077513 A1 3/2013 Ng et al.
2013/0148534 A1 6/2013 Jung et al.

OTHER PUBLICATIONS

LG Electronics Inc, "Issues of Redundant Measurement Reports," 3GPP TSG-RAN WG2 #79, R2-123585, Qingdao, China, Aug. 13-17, 2012, 3 pages, XP050665620.
LG Electronics Inc, "Report Upon Change of Order of CSI-RSTriggeresList Entries," 3GPP TSG-RAN WG2 #79, R2-123586, Qingdao, China, Aug. 13-17, 2012, 5 pages, XP050665621.
ETRI, Discussion on further details of Scenario 4,—6.3.1.2 Further details of scenarios, 3GPP TSG RAN WG1 Meeting #64, Taipei, Taiwan, Feb. 21-25, 2011.

* cited by examiner

METHOD FOR MEASURING AND REPORTING CSI-RS IN WIRELESS COMMUNICATION SYSTEM, AND APPARATUS FOR SUPPORTING SAME

CROSS REFERENCE TO RELATED APPLICATIONS

This application is the National Phase of PCT International Application No. PCT/KR2013/006598, filed on Jul. 23, 2013, which claims priority under 35 U.S.C. 119(e) to U.S. Provisional Application No. 61/674,401, filed on Jul. 23, 2012, 61/678,113, filed on Aug. 1, 2012, 61/679,077, filed on Aug. 3, 2012 and 61/680,276, filed on Aug. 7, 2012, all of which are hereby expressly incorporated by reference into the present application.

BACKGROUND OF THE INVENTION

Field of the Invention

The present invention relates to wireless communication and, more particularly, to a method for measuring and reporting a channel state information-reference signal (CSI-RS) in a wireless communication system and an apparatus for supporting the same.

Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

In recent years, with the supply of smart phones, a request of a user wanting to receive a data service having a high level of quality regardless of time and location has been increased. Accordingly, there is a need capable of supporting high data rate to terminals located at an outer peripheral portion of a cell as well as a center of the cell. The center of the cell may increase a data transmission rate by supporting an additional antenna port by cells. However, since the outer peripheral portion of the cell may be significantly interfered with a peripheral cell, it may be difficult to increase the data rate greater than a certain limit without cooperation between cells. Further, in order for a user to provide a data service having a high rate in a dense zone, a reuse technology of a frequency through a small cell such as a Pico cell or a Femto cell in a zone of a Macro cell is supplied so that a requirement of a method of efficiently interference between transmission points has been increased.

A 3GPP provides a Coordinated Multi-Point transmission and reception (CoMP) scheme as a method of controlling the above interference. According to the CoMP, since the terminal simultaneously receives data through a Transmission Point (TP) such as a plurality of base stations or a plurality of antennas or receives the data from the best TP, a better service may be provided to the terminal. In order to provide the better service through the CoMP, uplink and downlink reference signals, channel state information of the terminal, a control channel structure, and a method of controlling uplink power have been continuously discussed.

SUMMARY OF THE INVENTION

The present invention provides a method for measuring and reporting a channel state information-reference signal (CSI-RS) in a wireless communication system and an apparatus for supporting the same.

In an aspect, a method for measuring and reporting a channel state information-reference signal (CSI-RS) in a wireless communication system is provided. The method comprises transmitting a first measurement report message, which includes at least one first CSI-RS measurement report, determining whether to report at least one second CSI-RS measurement result and transmitting a second measurement report message, which includes the at least one second CSI-RS measurement result, when the determination is made to report the second CSI-RS measurement result, wherein the determination of whether to report is based on a first CSI-RS trigger list, which is a list of one or more first CSI-RS resources that are related to the at least one first CSI-RS measurement result, and a second CSI-RS trigger list, which is a list of one or more second CSI-RS resources that are related to the at least one second CSI-RS measurement result.

The determination of whether to report may comprise comparing the second CSI-RS trigger list with the first CSI-RS trigger list and determining to report the at least one second CSI-RS measurement result when the second CSI-RS trigger list is different from the first CSI-RS trigger list.

The method may further comprise determining that the second CSI-RS trigger list is different from the first CSI-RS trigger list when entries of the second CSI-RS trigger list is different from entries of the first CSI-RS trigger list.

The method may further comprise determining that the second CSI-RS trigger list is different from the first CSI-RS trigger list when the entries of the first CSI-RS trigger list and the entries of the second CSI-RS trigger list are arranged in a higher order of quality of a measurement result, the entries of the second CSI-RS trigger list are equal to the entries of the first CSI-RS trigger list, and an order of the entries of the second CSI-RS trigger list is different from an order of the entries of the first CSI-RS trigger list.

The determination of whether to report may further comprise determining not to report the at least one second CSI-RS measurement result when the second CSI-RS trigger list is equal to the first CSI-RS trigger list. The method may further comprise non-transmitting the second measurement reporting message when it is determined that the at least one second CSI-RS measurement result is not reported.

The method may further comprise determining that the second CSI-RS trigger list is equal to the first CSI-RS trigger list when the entries of the first CSI-RS trigger list are equal to the entries of the second CSI-RS trigger list, and the order of the entries of the second CSI-RS trigger list is equal to the order of the entries of the first CSI-RS trigger list.

The first measurement reporting message may further comprise the first CSI-RS trigger list.

The second measurement reporting message may further comprise the second CSI-RS trigger list.

The method may further comprise starting a period timer when transmitting the first measurement reporting message. The determination of whether to report may be performed when the period timer is terminated.

The method may further comprise receiving a measurement setting message including setting information for a measurement report from a network. The measurement setting message may comprise reporting setting indicating a reporting condition associated with the at least one first CSI-RS measurement result and the second CSI-RS measurement result. The reporting setting may comprise information indicating whether to report based on the first CSI-RS trigger list and the second CSI-RS trigger list.

In another aspect, a user equipment operating in a wireless communication system is provided. The wireless apparatus comprises a Radio Frequency (RF) unit that sends and receives radio signals and a processor that is functionally coupled to the RF unit and operates, wherein the processor is configured to transmit a first measurement report message, which includes at least one first CSI-RS measurement report, determine whether to report at least one second CSI-RS measurement result and transmit a second measurement report message, which includes the at least one second CSI-RS measurement result, when the determination is made to report the second CSI-RS measurement result. The determination of whether to report is based on a first CSI-RS trigger list, which is a list of one or more first CSI-RS resources that are related to the at least one first CSI-RS measurement result, and a second CSI-RS trigger list, which is a list of one or more second CSI-RS resources that are related to the at least one second CSI-RS measurement result.

The method for measuring and reporting a CSI-RS according to an embodiment of the present invention allows a UE to report channel state information to a plurality of TPs in an effective way. If necessary, the UE may essentially increase use efficiency of a radio resource by reporting the CSI-RS measurement result to the network. The UE efficiently reports a CRI-RS measurement report so that the network allows the UE to operate a suitable CRI-RS resource, thereby improving an operation performance of the UE.

DESCRIPTION OF EXEMPLARY EMBODIMENTS

Figure 1:
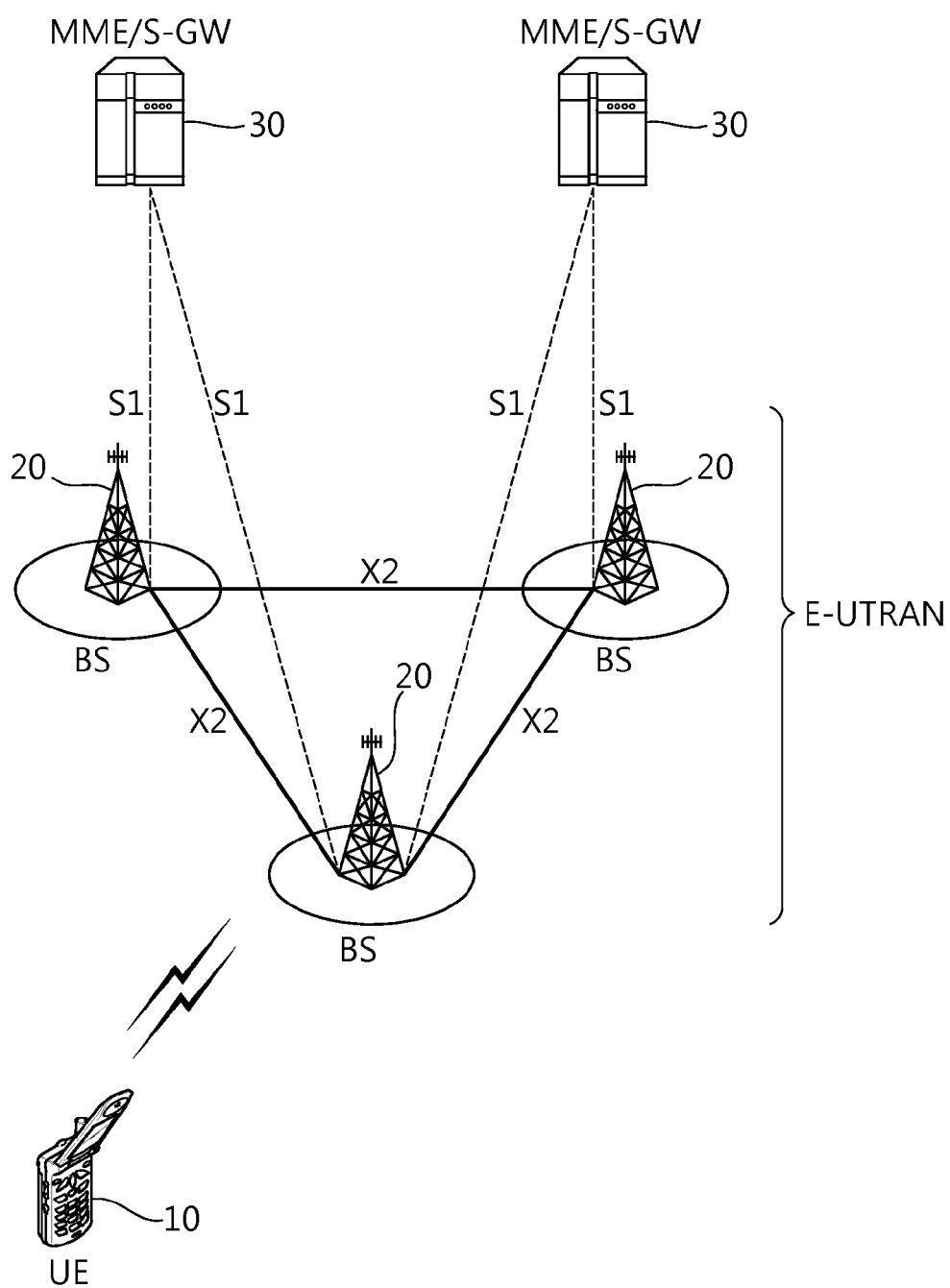
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
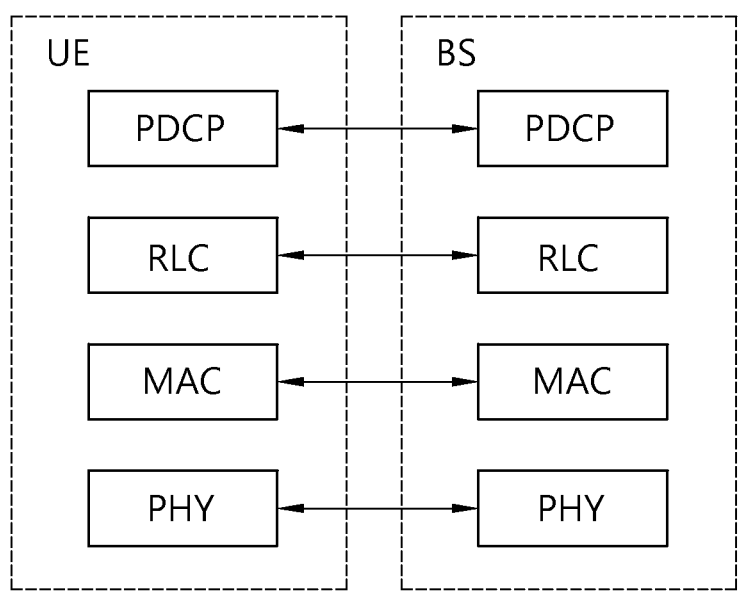
FIG. 2 is a block diagram illustrating a radio protocol architecture for a user plane.
Figure 3:
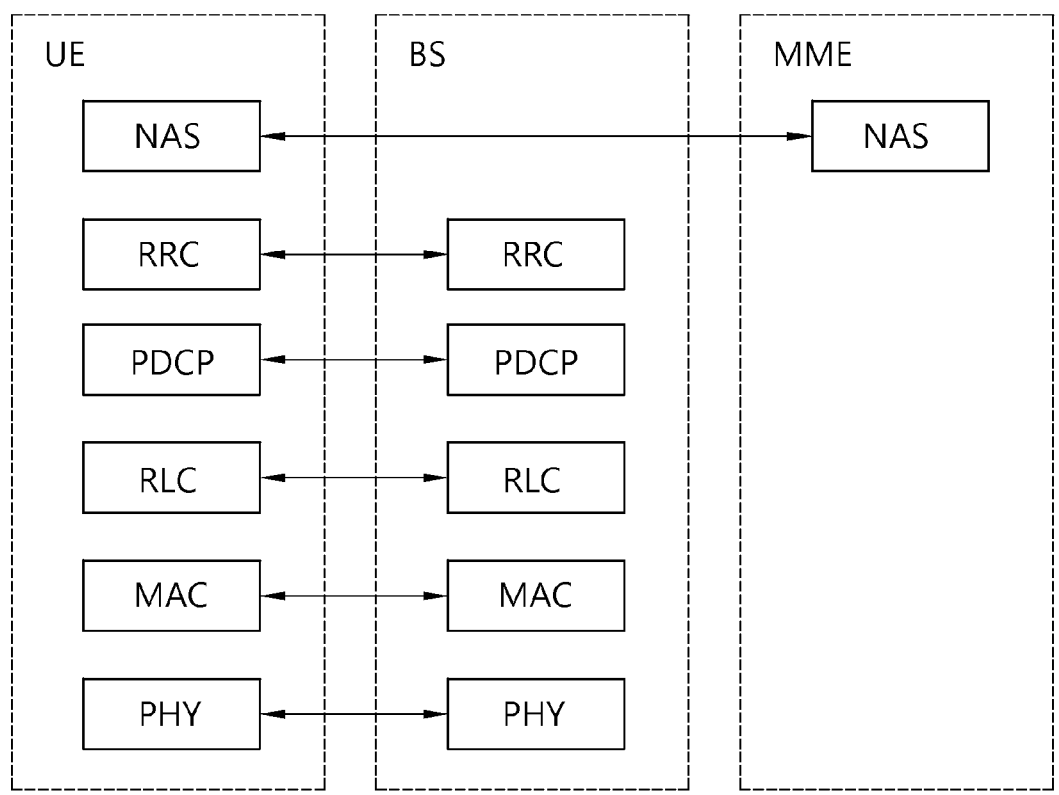
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information.

According to section 5.2.2 of 3GPP TS 36.331 V8.7.0 (2009 September) "Radio Resource Control (RRC); Protocol specification (Release 8)", the system information is divided into a master information block (MIB), a scheduling block (SB), and a system information block (SIB). The MIB allows the UE to know a physical configuration of the corresponding cell, for example, a bandwidth. The SB notifies transmission information of the SIBs, for example, a transmission period and the like. The SIB is a set of system information related to each other. For example, any SIB includes only information on a peripheral cell, and any SIB includes only information on an uplink radio channel used in the UE.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
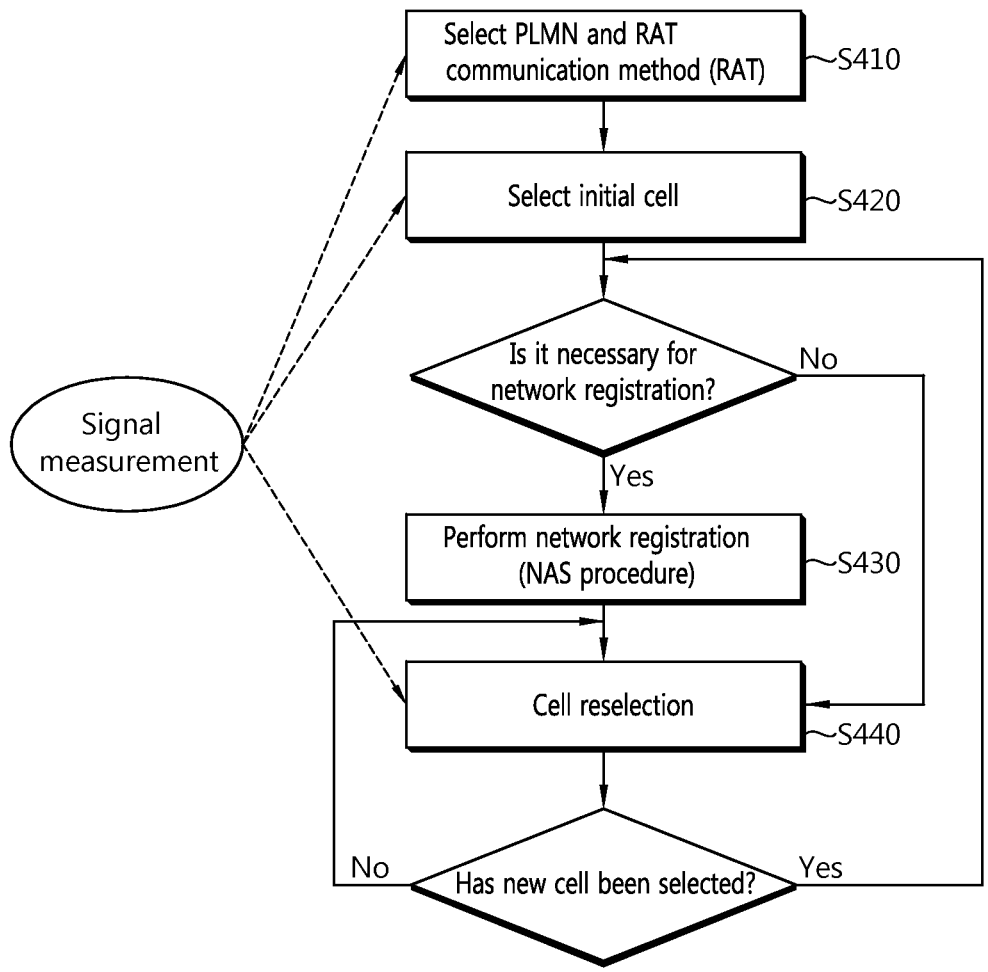
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
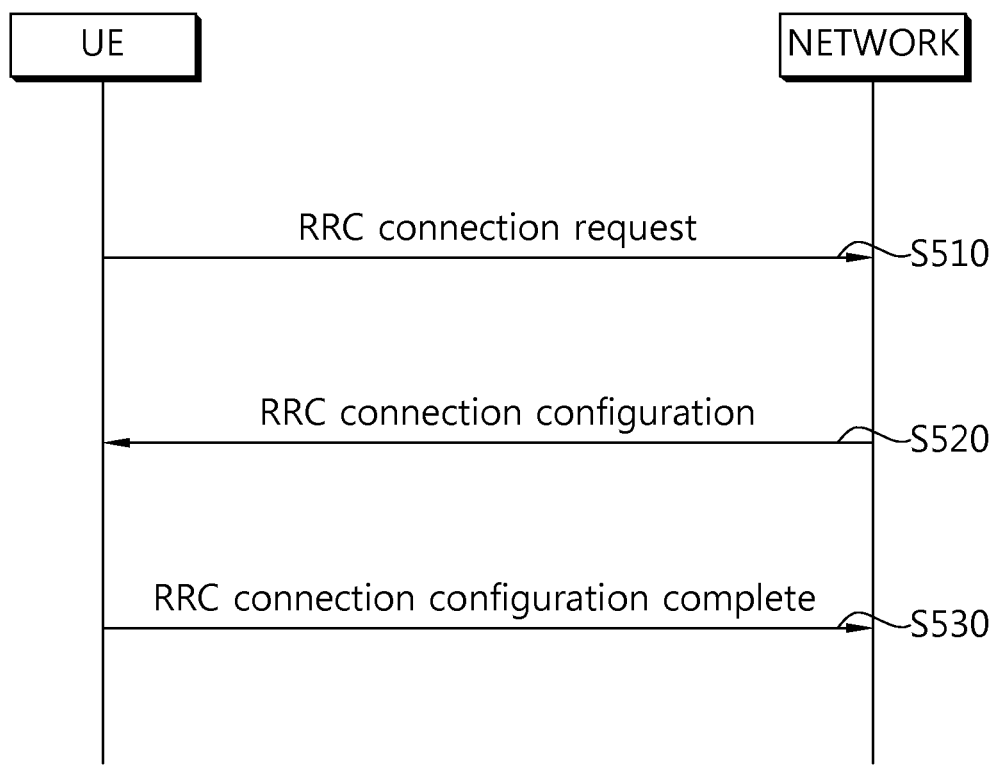
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
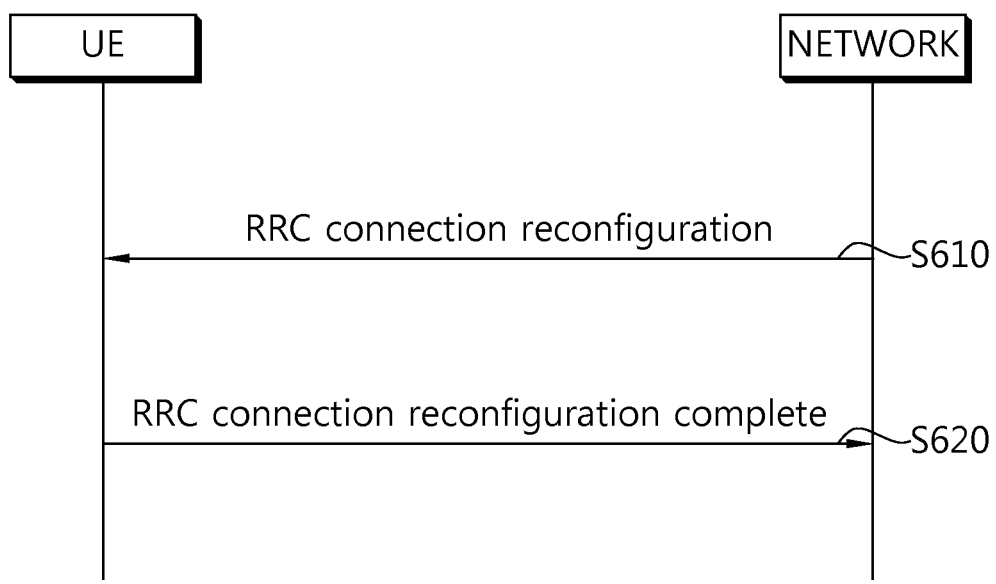
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009 March) "User Equipment (UE) procedures in idle mode (Release 8)".

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_s = Q_{meas,s} + Q_{hyst}, R_n = Q_{meas,n} - Q_{offset}$$ [Equation 1]

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion Rs of the serving cell and the ranking criterion Rn of the neighbor cell are changed in a similar state, the ranking order is frequently reversed as the changing result, and as a result, the UE may alternately reselect the two cells. Qhyst is a parameter for preventing the UE from alternately reselecting the two cells by giving the hysteresis in the cell reselection.

The UE measures the Rs of the serving cell and the Rn of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

Hereinafter, radio link monitoring (RLM) will be described.

The UE monitors downlink quality based on a cell-specific reference signal in order to detect the downlink radio link quality of the PCell. The UE estimates the downlink radio link quality for monitoring the downlink radio link quality and compares the estimated quality with threshold values Qout and Qin. The threshold value Qout is defined as a level in which the downlink radio link may not be stably received, and corresponds to a block error rate of 10% of hypothetical PDCCH transmission by considering a PDFICH error. The threshold value Qin is defined a downlink radio link quality level which may be more stably received than the level of the Qout and corresponds to a block error rate of 2% of hypothetical PDCCH transmission by considering a PCFICH error.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:

a case where the UE determines that there is a serious problem in the downlink communication link quality based on the radio quality measuring result of the PHY layer (determines that the quality of the PCell is low during the RLM.

a case where the UE determines that there is a problem in the uplink transmission when a random access procedure is continuously failed in a MAC sub-layer.

a case where the UE determines that there is a problem in the uplink transmission when uplink data transmission is continuously failed in an RLC sub-layer.

a case where the UE determines that the handover is failed.

a case where a massage received by the UE does not pass through an integrity check.

Hereinafter, the RRC connection re-establishment procedure will be described in more detail.

Figure 7:
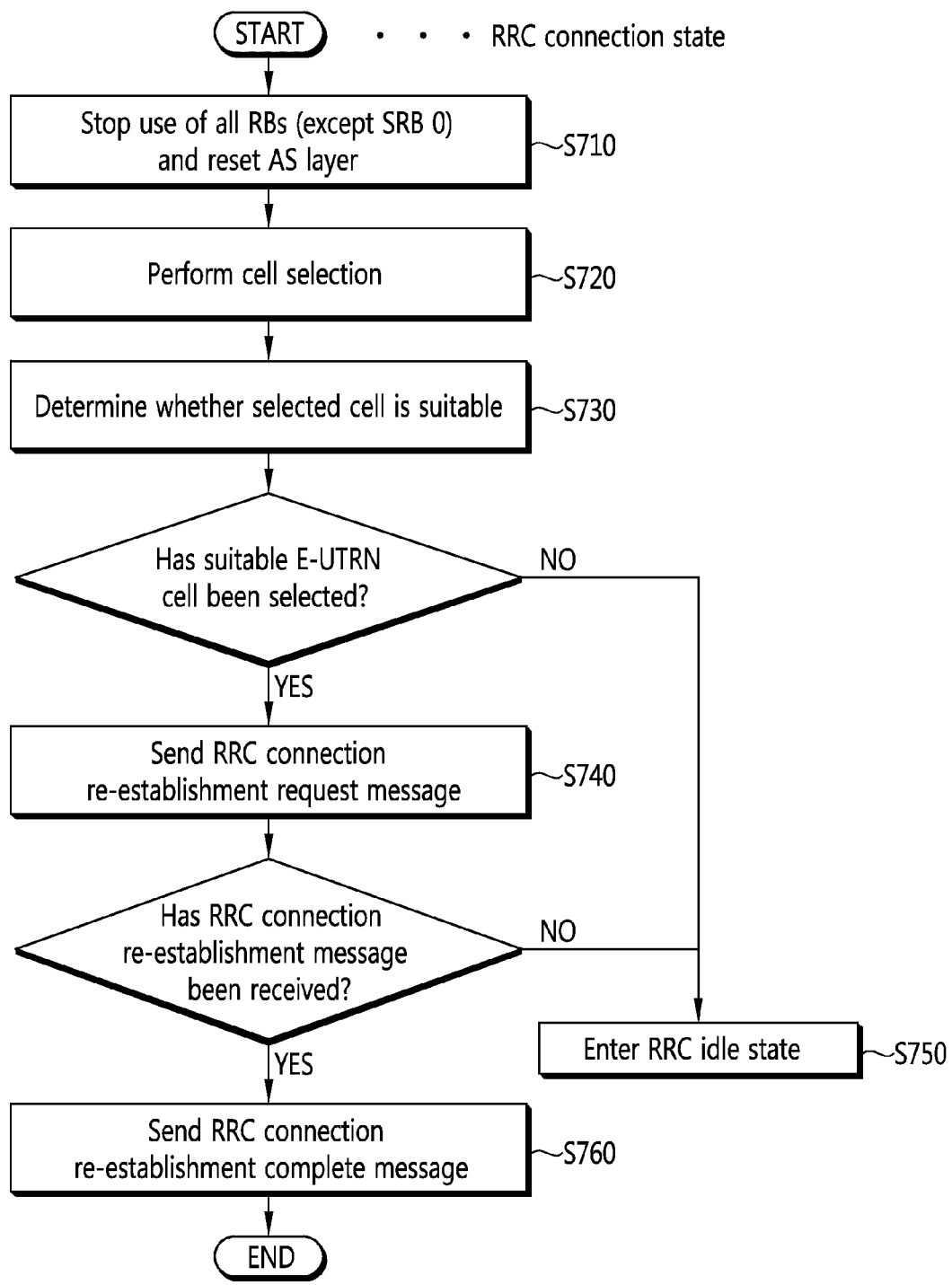
FIG. 7 is a diagram illustrating a RRC connection re-establishment procedure.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the sell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Next, a report of the RLF will be described.

When the RLF is generated or a handover failure is generated, the UE reports such a failure event to the network in order to support mobility robustness optimisation (MRO) of the network.

After the RRC connection reestablishment, the UE may provide the RLF report to the eNB. The radio measurement included in the RLF report may be used as a potential cause of the failure in order to identify coverage problems. This information may be used for excluding the events in the MRO evaluation for the intra-LTE mobility connection failure and transmitting the events as inputs for other algorithms.

When the RRC connection reestablishment is failed or the UE does not perform the RRC connection reestablishment, the UE is reconnected in the idle mode to generate the valid RLF report for the eNB. For the purpose, the UE stores information on the latest RLF or the handover failure, and may indicate to the LTE cell that the RLF report is valid every subsequent RRC connection (re)establishment and handover, until the RLF report is asked by the network or for 48 hours after the RLF or the handover failure is detected.

The UE maintains the information for the state transition and the RAT change, and returns to the LTE RAT and then indicates the RLF report is valid again.

The validity of the RLF report in the RRC connection configuration procedure indicates that the UE receives disturbance such as connection failure and the RLF report is not transmitted to the network due to the failure. The RLF report from the UE includes the following information.

E-CGI of a last cell (in the case of RLF) which provided the service to the UE or a handover target When the E-CGI is not known, PCI and frequency information are used instead.

E-CGI of the cell which attempted to reestablishment.

E-CGI to the cell which provided the service to the UE, when the last handover is initialized, for example, message 7 (RRC connection reconfiguration) is received by the UE.

Time from the last handover initialization to the connection failure information indicating whether the connection failure is due to the RLF or the handover failure radio measurements position of the failure The eNB receiving the RLF failure from the UE may forward the report to the eNB which has provided the service to the UE before the reported connection failure. The radio measurements included in the RLF report may be used for identifying coverage issues as a potential cause of the radio link failure. This information may be used for excluding the events from the MRO evaluation of the intra-LTE mobility connection failure and transmitting the events as the input of other algorithms.

Hereinafter, a measurement and a measurement report will be described.

In a mobile communication system, supporting mobility of UE is required. Accordingly, the UE continuously measures a quality for a serving cell that provides a current service and a quality for a neighbor cell. The UE reports a measurement result to a network at an appropriate time and a network provides optimal mobility to the UE through a handover, and the like. Commonly, the measurement for the purpose is called a radio resource management (RRM) measurement.

The UE may perform a measurement for a specific purpose set by the network and reports a measurement result thereof to the network, in order to provide information to help a provider to operate the network in addition to the purpose of supporting the mobility. For example, the UE receives broadcast information of a specific cell determined by the network. The UE may report to the serving cell a cell identity (also referred to as a global cell identity) of the specific cell, position identification information (for example, tracking area code) to which the specific cell belongs, and/or other cell information (for example, whether a closed subscriber group (CSG) cell is member).

When the UE which is moving verifies that a quality in a specific region is very bad through the measurement, positional information and a measurement result regarding cells of which the qualities are bad may be reported to the network. The network may attempt optimization of the network based on the report of the measurement result of the UEs that help operating the network.

In a mobile communication system in which a frequency reuse factor is 1, mobility is most achieved among different cells which are in the same frequency band. Accordingly, in order to well guarantee the mobility of the UE, the UE needs to well measure qualities and cell information of neighbor cells having center frequencies which is the same as a center frequency of the serving cell. A measurement for the cell having the center frequency which is the same as the center frequency of the serving cell as described above is called an intra-frequency measurement. The UE reports the measurement result to the network at an appropriate time by performing the intra-frequency measurement to achieve the purpose of the corresponding measurement result.

A mobile communication provider may operate the network by using a plurality of frequency bands. When a service of the communication system is provided through the plurality of frequency bands, the UE may need to well measure qualities and cell information of neighbor cells having center frequencies which are different from the center frequency of the serving cell, in order to guarantee optimal mobility for the UE. As described above, a measurement for the cell having the center frequency which is different from the center frequency of the serving cell is called an inter-frequency measurement. The UE may need to report the measurement result to the network at an appropriate time by performing the inter-frequency measurement.

When the UE supports a measurement for the network based on an RAT, the UE may perform a measurement for a cell of the corresponding network by a configuration by the base station. The measurement is called an inter-RAT measurement. For example, the RAT may include a UMTS terrestrial radio access network (UTRAN) and a GSM EDGE radio access network (GERAN) that follow a 3GPP standard specification and may also include a CDMA 2000 system that follows a 3GPP2 standard specification.

Figure 8:
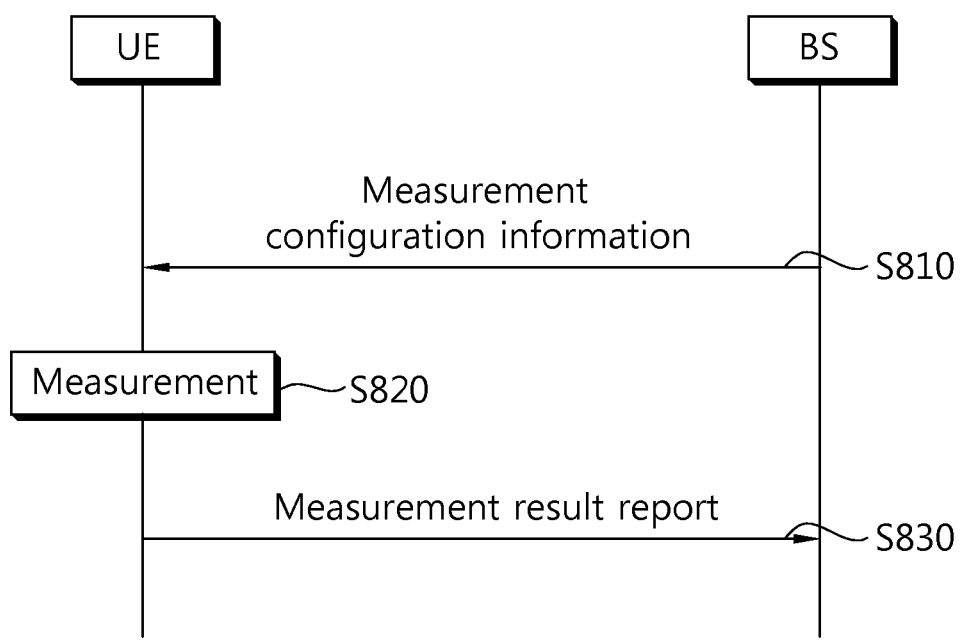
FIG. 8 is a flowchart illustrating a method for performing measurement in the related art.

FIG. 8 is a flowchart illustrating a method for performing measurement in the related art.

The UE receives measurement configuration information from the base station (S810). A message including the measurement configuration information is called a measurement configuration message. The UE performs the measurement based on the measurement configuration information (S820). The UE reports the measurement result to the base station when the measurement result satisfies a reporting condition in the measurement configuration information (S830). A message including the measurement result is called a measurement reporting message.

The measurement configuration information may include the following information.

(1) Measurement object information: The measurement object information is information on an object for which the UE is to perform a measurement. A measurement object may include at least one of an intra-frequency measurement object which is an object of an intra-cell measurement, an inter-frequency measurement object which is an object of an inter-cell measurement, and an inter-RAT measurement object which is an object of an inter-RAT measurement. For example, the intra-frequency measurement object may indicate the neighbor cell having the same frequency band as the serving cell, the inter-frequency measurement object may indicate the neighbor cell having the different frequency band from the serving cell, and the inter-RAT measurement object may indicate a neighbor cell of RAT different from the RAT of the serving cell.

(2) Reporting configuration information: The reporting configuration information is information on a reporting condition and a reporting type regarding the time when the UE reports the measurement result. The reporting condition may include information on an event or a cycle in which reporting the measurement result is triggered. The reporting type is information regarding a configuration type of the measurement result.

(3) Measurement identity information: is information on a measurement identity when the terminal reports a certain object to be measured in a certain type by associating an object to be measured with a report setting. The measurement identity information is included in a measurement report message so that a measurement result is related to a certain object to be measured, and may indicate that a measurement report is generated as a certain report condition.

(4) Quantity configuration information: represents information on a parameter for setting filtering of a measurement unit, report unit and/or measurement result value.

(5) Measurement gap information: The measurement gap information is information on a measurement gap which is an interval which the UE may use for only measurement without considering data transportation with the serving cell because downlink transportation or uplink transportation is not scheduled.

The UE has a measurement object list, a measurement reporting configuration list, and a measurement identity list in order to perform a measurement procedure.

In the 3GPP LTE, the base station may configure only one measurement object for one frequency band to the UE. According to Clause 5.5.4 of 3GPP TS 36.331 V8.5.0 (2009 March) "Evolved Universal Terrestrial Radio Access (E-UTRA) Radio Resource Control (RRC); Protocol specification (Release 8)", events that trigger the measurement reporting shown in the following table are defined.

TABLE 1

| Events | Reporting conditions |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

When the measurement result of the UE satisfies the configured event, the UE transports the measurement reporting message to the base station.

Figure 9:
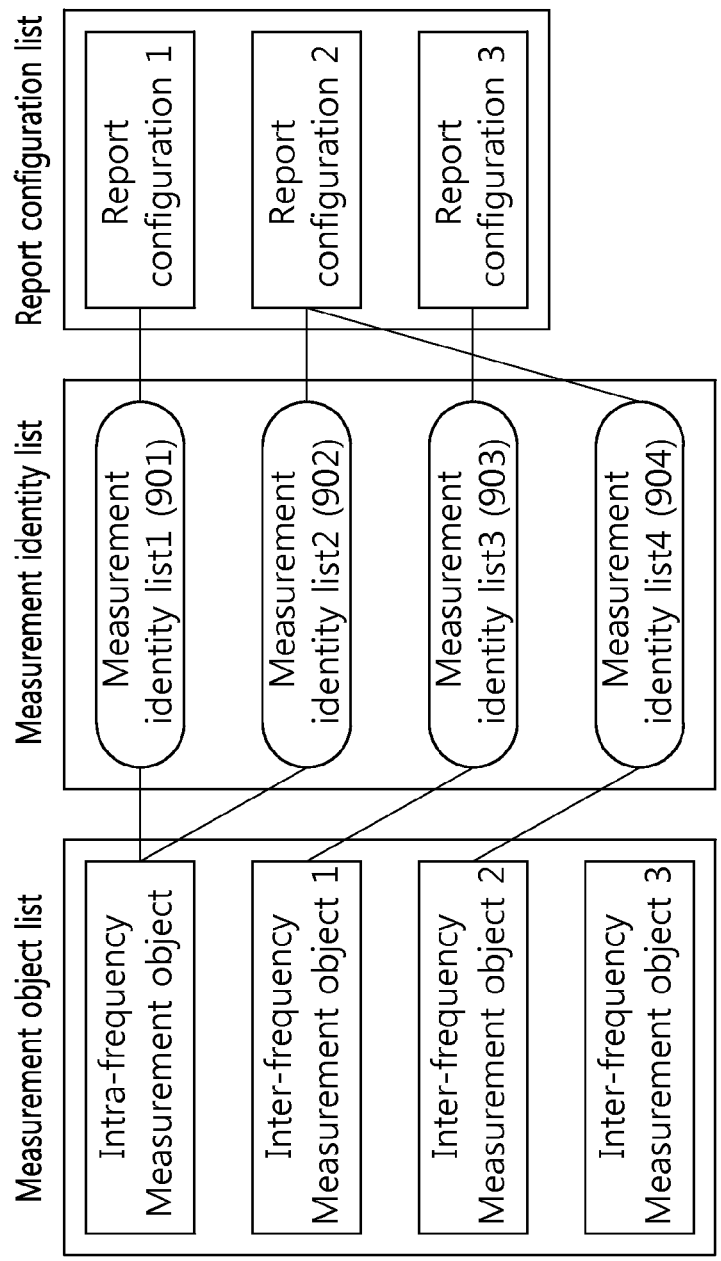
FIG. 9 illustrates an example of a measurement configuration which is configured to user equipment.

FIG. 9 illustrates an example of a measurement configuration which is configured to user equipment.

First, measurement identity 1 901 connects the intra-frequency measurement object and reporting configuration 1. The UE performs intra frequency measurement and the reporting configuration 1 is used to determine a reference and a reporting type of reporting the measurement result.

Measurement identity 2 902 is connected with the intra-frequency measurement object similarly to the measurement identity 1 901, but the intra-frequency measurement object is reporting configuration 2. The UE performs measurement and the reporting configuration 2 is used to determine the reference and the reporting type of reporting the measurement result.

By the measurement identity 1 901 and the measurement identity 2 902, the UE transports the measurement result even though the measurement result for the intra-frequency measurement object satisfies any one of the reporting configuration 1 and the reporting configuration 2.

Measurement identity 3 903 connects inter-frequency measurement object 1 and reporting configuration 3. When a measurement result for the inter-frequency measurement object 1 satisfies a reporting condition included in the reporting configuration 1, the UE reports the measurement result.

Measurement identity 4 904 connects the inter-frequency measurement object 2 and the reporting configuration 2. When a measurement result for the inter-frequency measurement object 2 satisfies a reporting condition included in the reporting configuration 2, the UE reports the measurement result.

Meanwhile, the measurement object, the reporting configuration, and/or the measurement identity may be added, changed, and/or deleted. These may be instructed when the base station sends a new measurement configuration message or a measurement configuration change message to the UE.

Figure 10:
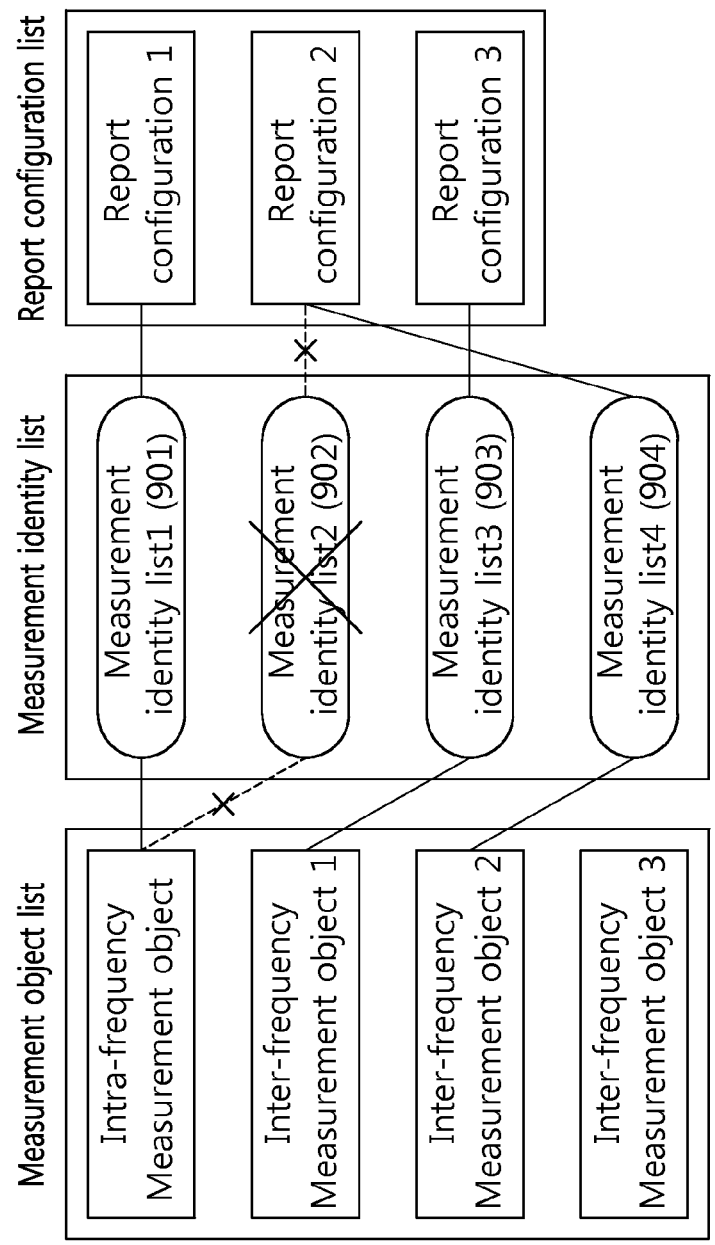
FIG. 10 illustrates an example of deleting a measurement identity.

FIG. 10 illustrates an example of deleting a measurement identity. When the measurement identity 2 902 is deleted, measurement for a measurement object associated with the measurement identity 2 902 is stopped and a measurement report is not transported. A measurement object or a reporting configuration associated with the deleted measurement identity may not be changed.

Figure 11:
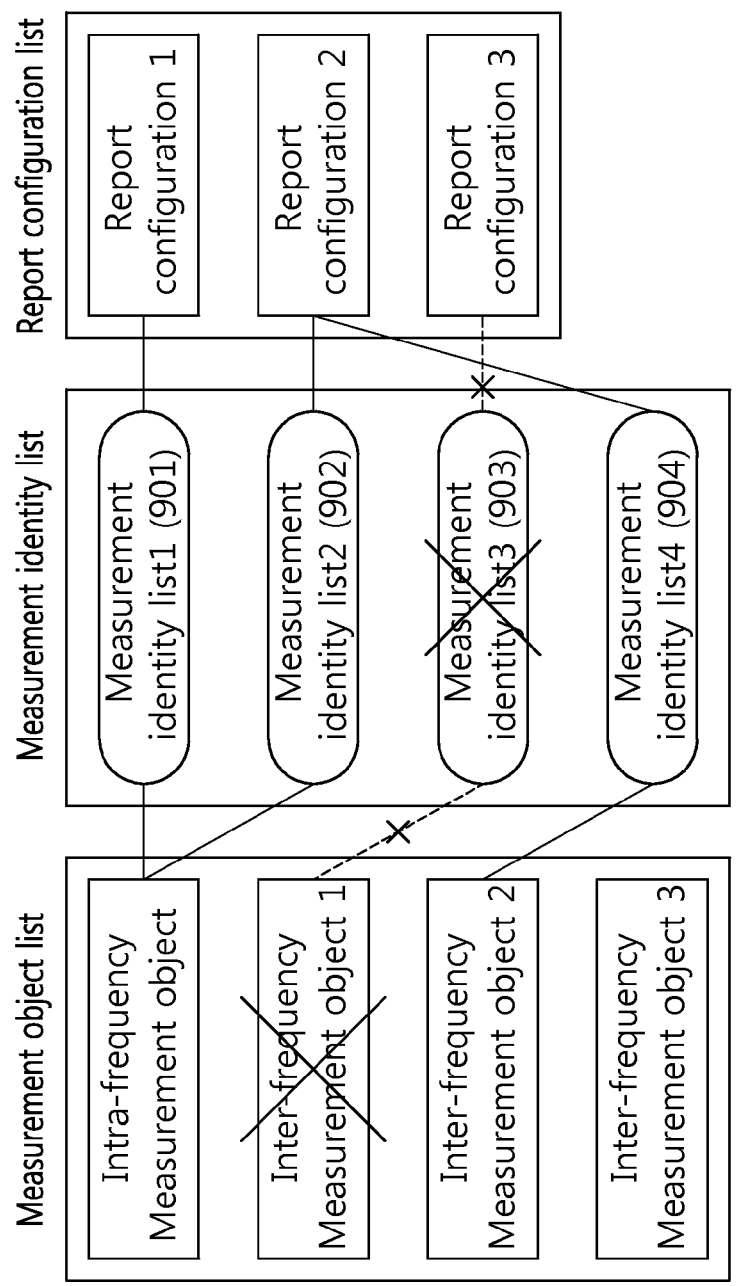
FIG. 11 illustrates an example of deleting a measurement object.

FIG. 11 illustrates an example of deleting the measurement object. When the inter-frequency measurement object 1 is deleted, the UE deletes even the measurement identity 3 903 associated therewith. Measurement for the inter-frequency measurement object 1 is stopped and a measurement report is not also transported. However, a reporting configuration associated with the deleted inter-frequency measurement object may not be changed or deleted.

When the reporting configuration is removed, the UE removes even a measurement identity associated therewith. The UE stops measurement for an associated measurement object by the associated measurement identity. However, the measurement object associated with the deleted reporting configuration may not be changed or deleted.

The measurement report may include the measurement identity, a measured quality of the serving cell, and a measurement result of the neighbor cell. The measurement identity identifies a measurement object in which the measurement report is triggered. The measurement result of the neighbor cell may include a cell identity and a measurement quality of the neighbor cell. The measured quality may include at least one of reference signal received power (RSRP) and reference signal received quality (RSRQ).

A current wireless communication system uses various reference signals in order to provide information on a communication environment to a counterpart device through uplink or downlink.

As one of reference signals, a Cell specific Reference Signal (CRS) is transmitted for each sub-frame in order to recognize channel information upon transmission of downlink. In this case, different temporal/frequency domains are allocated and transmitted to four antennas according to 4 which is the number of maximum antenna ports supported from downlink of a wireless communication system. In an existing wireless communication system, Channel State Information (CSI) is acquired for channel estimation or the CRS may be used for Radio Resource Monitoring (RRM) measurement and demodulation.

Meanwhile, a recent wireless communication system supports a downlink transmission scheme through maximum 8 antennas. Accordingly, the above transmission scheme may not be supported by the CRS defined with respect to four antennas. In addition, in a measurement side based on the CRS, transmission of the CRS every sub-frame may lower a wireless resource use efficiency due to overhead.

In order to compensate for the above problem, a Channel State Information Reference Signal (CSI-RS) is introduced as a reference signal to acquire channel state information. The terminal may acquire channel state information through channel estimation by performing measurement based on the CSI-RS. The existing CRS may be implemented to be used for measuring an RRM by introducing the CSI-RS. Further, a Demodulation Reference Signal (DM-RS) may be separately provided for demodulation.

Hereinafter, Coordinated Multi-Point transmission and reception (CoMP) will be described.

In a cellular network, since interference from a neighbor cell is low, a cell center zone may support an additional antenna port regardless of transmission of the neighbor cell or may increase a data transmission rate through carrier aggregation.

Meanwhile, since an outer peripheral portion of the cell may be significantly interfered with a neighbor cell, it may be difficult to transmit data through increase of the antennas or carrier aggregation. The CoMP is suggested to minimize mutual interference when peripheral cells of the terminal perform coordinated communication and provide a better service by improving a data transmission rate in an environment such as an outer peripheral portion of the cell where interference may be significantly operated. The CoMP is a technology which is applicable to a situation where a macro cell and a pico cell or a Femto cell coexist as well as an interference environment between macro cells.

Figure 12:
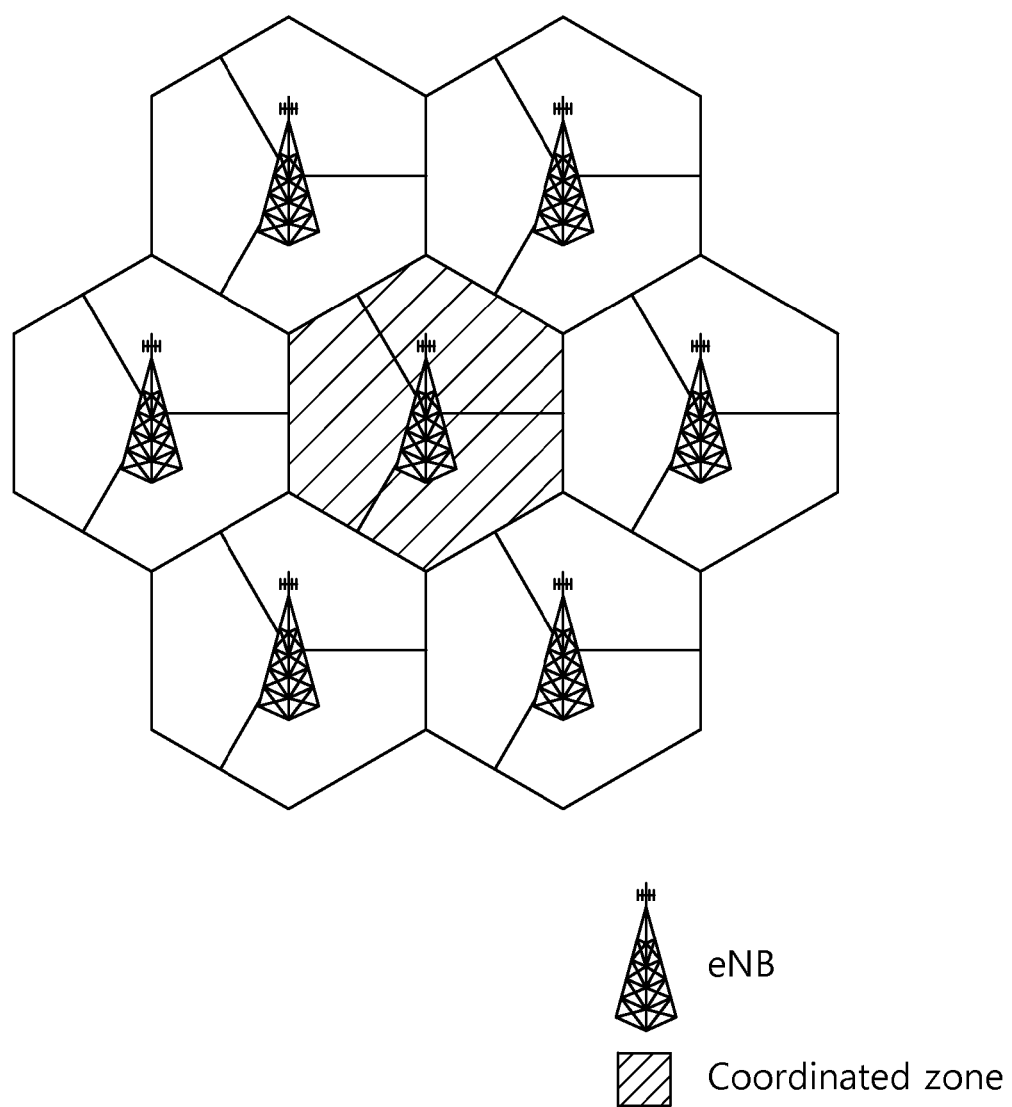
FIG. 12-14 illustrate scenarios with application of the CoMP.
Figure 14:
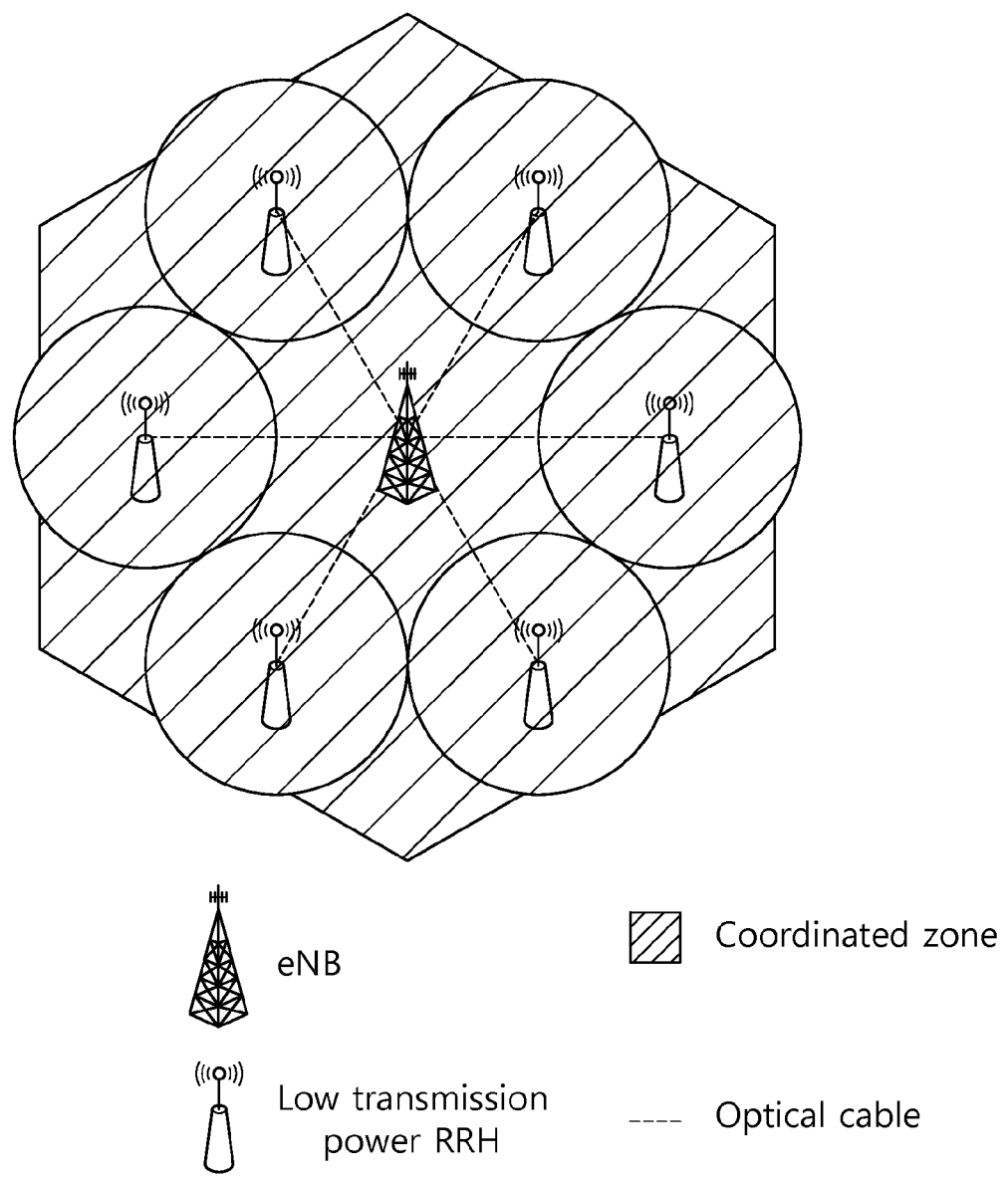

A scenario with application of the CoMP may be illustrated in FIGS. 12 and 14.

A first scenario shown in FIG. 12 indicates a case where coordinated communication between sectors in one base station is achieved (Homogeneous network with intra-site CoMP).

Figure 13:
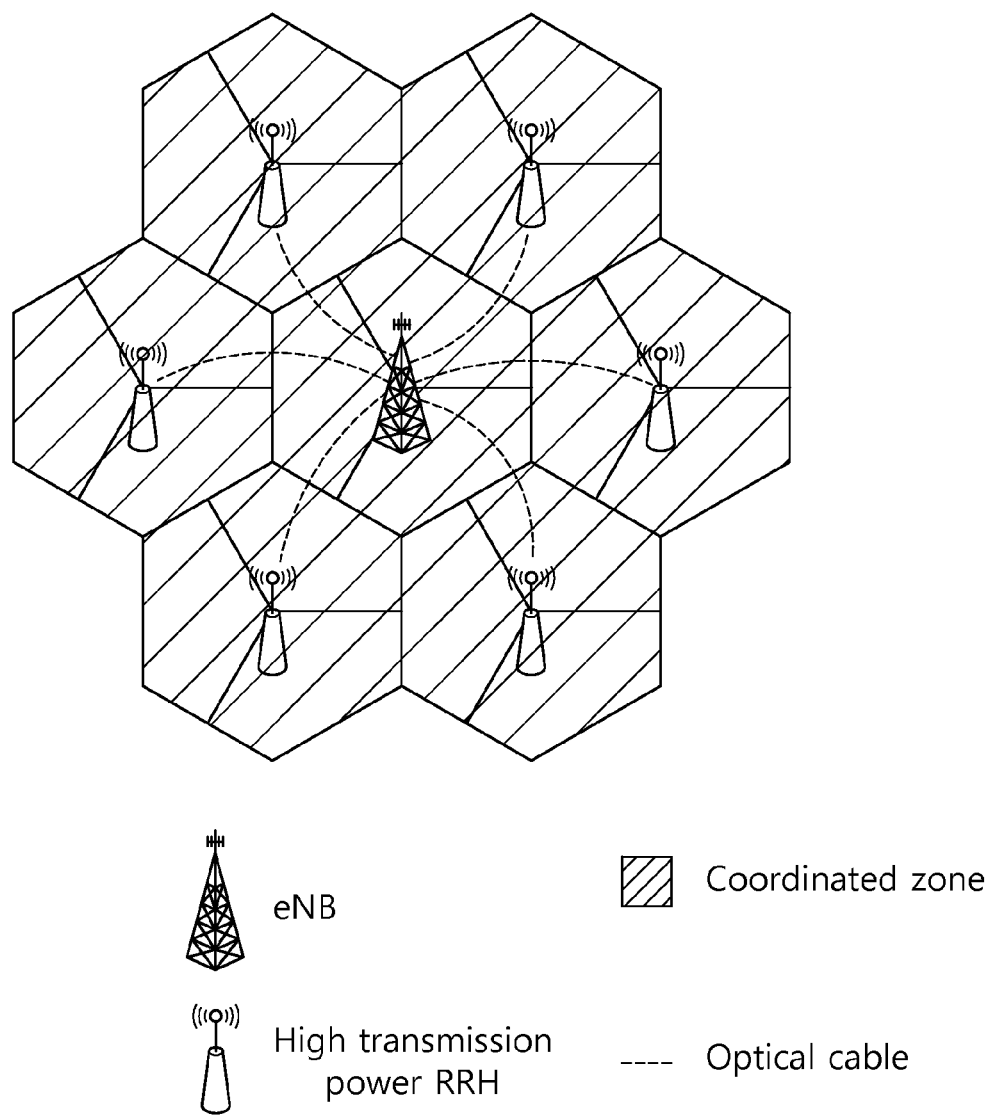

A second scenario shown in FIG. 13 indicates a case where coordinated communication is achieved between base stations in an environment in which an optical cable is located between base stations (Homogeneous network with high Tx power Remote Radio Heads (RRHs)).

Third and fourth scenarios shown in FIG. 14 assume a heterogeneous network environment where Transmission Points (TPs) having different transmission powers exit. That is, the coordinated communication is achieved between low power radio heads and high power radio heads arranged in a macro cell zone.

The third scenario is a case where the low power radio head has a cell ID. That is, the third scenario considers coordinated transmission between the macro cell and a pico cell in a heterogeneous network.

The third scenario indicates a case where low power radio heads have the same cell ID as that of the macro cell. That is, the fourth scenario considers a Distributed Antenna System (DAS) which is coordinated transmission between radio heads spreading at a full region of the macro cell.

When the CoMP is applied, following schemes are considered in a coordinated scheme between TPs.

Coordinated scheduling: Mutual coordinated TPs minimize interference by suitably adjusting temporal or frequency resources transmitting a signal and increase a quality of a signal received by the terminal.

Coordinated beamforming: Mutual coordinated TPs minimize interference in another TP by suitably adjusting a direction of a beam formed for transmitting a signal and increase a quality of a signal received by the terminal.

Joint processing: Mutual coordinated TPs simultaneously transmit a signal to one terminal or dynamically selects an optimal TP considering a channel situation of the terminal to transmit the signal to the terminal.

When base station coordinated communication is used, a serving terminal sets a Channel State Information-Reference Signal (CSI-RS) resource of each TP in the terminal so that the terminal may measure a channel state between another TP and the terminal except for the serving cell. The terminal measures a CSI-RS resource of each TP, and acquires information on a channel state with respect to a corresponding TP. The terminal measures a CSI-RS resource to acquire CSI-RS resource results and reports the acquired CSI-RS resource results to the serving cell. The serving cell may share the CSI-RS measurement results acquired from the terminal with a peripheral TP associated with coordinated communication.

As in the RRM measurement and the CSI-RS measurement based on the above measurement setting, measurement results with respect to different types of measurement objects are independently reported to the network. Further, measurement results with respect to a measurement object associated with a mutual independent reporting condition are independently reported to the network according to whether to satisfy each reporting condition.

To recognize channel state information with respect to each TP by a plurality of TPs in an environment involved in terminal communication may exert great influence upon a throughput with respect to the terminal and efficiency of a wireless resource use. In order to accomplish the above object, the terminal may measure channel state information and may report measurement results in a network. However, when the channel state information is frequently reported, a wireless resource is consumed so that availability to be acquired using a plurality of TPs may be deteriorated. There is a need for a method for efficiently measuring and reporting channel state information by taking into consideration a trade-off relation.

Figure 15:
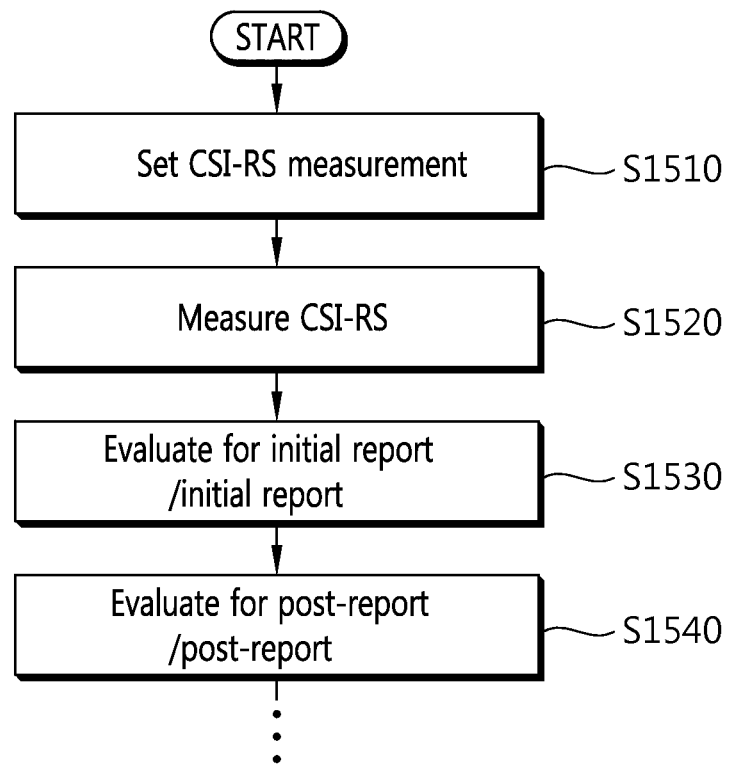
FIG. 15 is a flowchart illustrating a method for measuring and reporting a CSI-RS according to an embodiment of the present invention.

FIG. 15 is a flowchart illustrating a method for measuring and reporting a CSI-RS according to an embodiment of the present invention.

Referring to FIG. 15, the UE obtains CSI-RS measurement setting from a network (S1510). The CSI-RS measurement setting may be included in a measurement setting message to be transmitted for measuring and reporting an RRM of the UE by the network and may be transmitted.

The UE receives setting of at least one CSI-RS resource which is a measurement object through the CSI-RS measurement setting. Further, the UE receives setting of a reporting condition based on evaluation for a report of a measurement result with respect to the set CSI-RS resource. Information on the reporting condition may be included in the reporting setting for the CSI-RS measurement.

At least one CSI-RS resource included in a specific CSI-RS list among at least one CSI-RS resource may be combined with specific reporting setting. Moreover, one combination between the CSI-RS list and the reporting reference may be identified by a measurement identifier. A combination between the specific CSI-RS list and the specific reporting setting may be distinguished from a combination between another CSI-RS list and another reporting setting, which may be achieved through a measurement identifier associated with each combination. The UE may know a CSI-RS resource which is a measurement object through a CSI-RS list to perform a measurement based on the CSI-RS resource. Moreover, the UE may know a reporting condition through reporting setting associated with the CSI-RS list to determine whether the measurement result satisfies the reporting condition based on the reporting condition.

If a CSI-RS trigger list being a list of CSI-RS resources associated with the CSI-RS measurement results satisfying the reporting condition is changed, the UE may be configured to report the measurement result. To this end, the network may add a list change reporting indicator to measurement setting to provide the measurement setting. The list change reporting indicator may indicate to report the measurement result when changing the CSI-RS trigger list. The change of the CSI-RS trigger list may include change of a CSI-RS resource itself included in the list. Alternatively, the change of the CSI-RS trigger list may include change of an order of CSI-RS resources according to an order of a measurement result quality although the CSI-RS resource is not changed.

Figure 16:
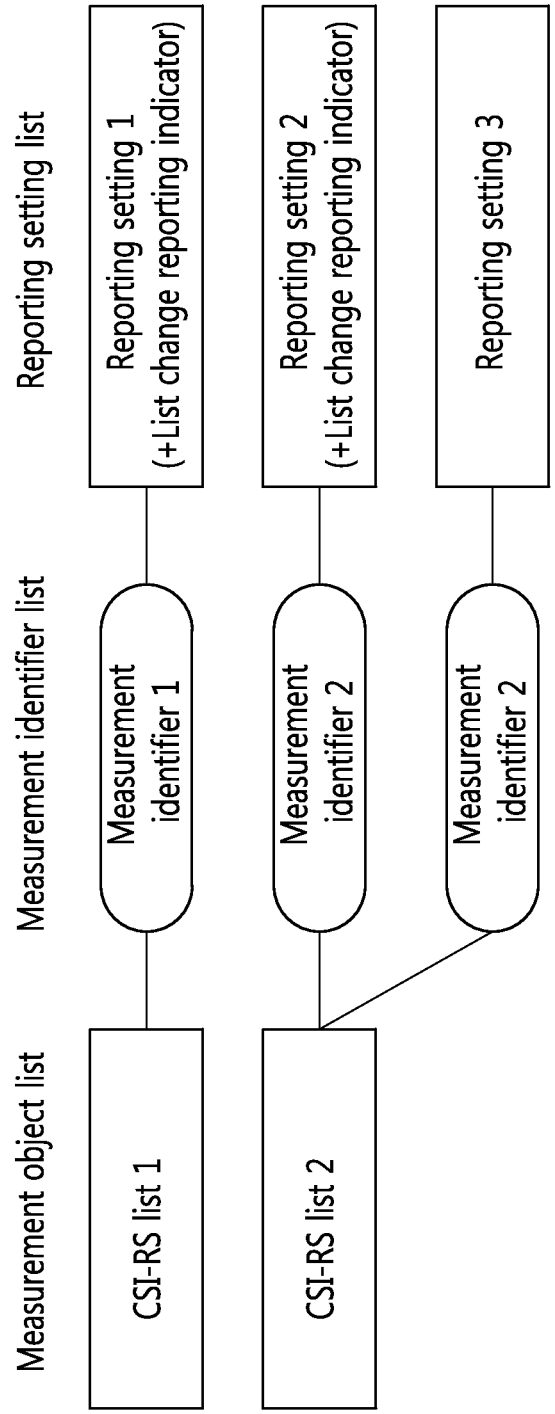
FIG. 16 is a diagram illustrating an example of measurement setting according to an embodiment of the present invention.

FIG. 16 is a diagram illustrating an example of measurement setting according to an embodiment of the present invention.

Referring to FIG. 16, a CSI-RS list 1 and a CSI-RS list 2 may be set to the UE through the measurement setting as the measurement object. The CSI-RS list 1 may be combined with reporting setting 1 through a measurement identifier 1. The CSI-RS list 2 may be combined with the reporting setting 2 through a measurement identifier 2, and may be combined with the reporting setting 3 through a measurement identifier 3.

The reporting condition to be set through the reporting setting is obtained based on an event or a period. Since a CSI-RS measurement result obtained to a corresponding time point satisfies the reporting condition, a period based reporting condition may be considered.

The event based reporting condition may be configured by a following table 2.

TABLE 2

| Event | Reporting condition |
| --- | --- |
| CSI-RS Event 1 | CSI-RS resource becomes better than threshold |
| CSI-RS Event 2 | CSI-RS resource becomes offset better than best CSI-RS resource |
| CSI-RS Event 3 | CSI-RS resource becomes offset better than the best CSI-RS resource, and the CSI-RS resource becomes better than absolute threshold |

In addition, each of the reporting setting 1 and the reporting setting 2 may include a list change reporting identifier. Accordingly, the UE may measure CSI-RS resources included in the CSI-RS list 1 to determine whether the CSI-RS measurement result satisfies a reporting condition according to the reporting setting 1. Moreover, the UE may measure CSI-RS resources included in the CSI-RS list 2 to determine whether the CSI-RS measurement result satisfies a reporting condition according to reporting setting 2 and/or reporting setting 3.

The CSI-RS measurement result satisfying the reporting condition of the reporting setting 3 may be reported when the reporting condition is satisfied. That is, a measurement result report associated with the reporting setting 3 may be performed based on whether to satisfy a specific reporting condition according to the reporting setting 3.

Meanwhile, the UE may determine whether to report a CSI-RS measurement result satisfying the reporting condition of the reporting setting 1 or to report a CSI-RS measurement result satisfying the reporting condition of the reporting setting 2 based on a CSI-RS triggering list. The CSI-RS trigger list may include a CSI-RS resource list with respect to CSI-RS measurement results satisfying a specific reporting condition. That is, the UE may determine whether to report the CSI-RS measurement result according to whether a CRI-RS trigger list is changed upon reporting a previous measurement result and upon determination whether to report. Hereinafter, a method for reporting a measurement based on the CSI-RS trigger list according to the present invention will be described in detail.

Referring back to FIG. 15 measures at least one CSI-RS resource allocated as a measurement object by obtaining the measurement setting to obtain a CSI-RS measurement result (S1520). The UE may obtain a CSI-RS measurement result by continuously measuring the CSI-RS resources allocated for a measurement.

The UE evaluates CSI-RS measurement results for an initial report to report CSI-RS measurement results (S1530). That is, UE which never previously reported the CSI-RS measurement result may report a CSI-RS measurement result satisfying the reporting condition of the measurement setting to the network. In this case, the UE may generate a CSI-RS trigger list which is a list of CSI-RS resources associated with the CSI-RS measurement result satisfying the reporting condition. The CSI-RS trigger list may include an identifier to identify CSI-RS resources with respect to CSI-RS measurement result satisfying the reporting condition. The included identifiers may be arranged in the higher order of the quality of associated CSI-RS measurement results. Alternatively, the included identifiers may be arranged in the lower order of the quality of associated CSI-RS measurement results. When reporting the CSI-RS measurement result, the UE may transmit a CSI-RS trigger list to the network together with the measurement result.

The UE may continuously perform the CSI-RS measurement after an initial measurement result report.

The UE performs evaluation for a post-report to report a measurement result according to the evaluation result to the network (S1540). The UE may evaluate the CSI-RS measurement results to determine whether the reporting condition is satisfied. Further, the UE may generate a CSI-RS trigger list with respect to CSI-RS resources associated with CSI-RS measurement results satisfying the reporting condition. The UE may determine whether to report the measurement result based on a newly generated CSI-RS trigger list and a previous CSI-RS trigger list. Hereinafter, for the purpose of convenience of description, a CSI-RS trigger list generated upon evaluation of the post-report refers to a second CSI-RS trigger list, and a CSI-RS trigger list generated upon a previous report (that is, a first report or a previous post-report) refers to a first CSI-RS trigger list.

1. If it is determined that the second CSI-RS trigger list is different from the first CSI-RS trigger list, the UE may report CSI-RS measurement results satisfying a reporting condition upon evaluation of the post-report. In this case, a case where the second CSI-RS trigger list is different from the first CSI-RS trigger list may be a following case. In a following example, entries associated with at least one CSI-RS resource included in a specific trigger list may be arranged in the higher order or in the lower order of quality of the measurement result with respect to a corresponding CSI-RS resource.

Example 1: first CSI-RS trigger list={CSI-RS resource 1, CSI-RS resource 2}
=>second CSI-RS trigger list={CSI-RS resource 2, CSI-RS resource 1}
Example 2: first CSI-RS trigger list={CSI-RS resource 1, CSI-RS resource 2}
=>second CSI-RS trigger list={CSI-RS resource 1}
Example 3: first CSI-RS trigger list={CSI-RS resource 1, CSI-RS resource 2}
=>second CSI-RS trigger list={CSI-RS resource 1, CSI-RS resource 2, CSI-RS resource 3}
Example 4: first CSI-RS trigger list={CSI-RS resource 1, CSI-RS resource 2}
=>second CSI-RS trigger list={CSI-RS resource 1, CSI-RS resource 3}

Referring to the above listed example, change in the CSI-RS trigger list may include change in an entry itself in the CSI-RS trigger list. Further, the changed in the CSI-RS trigger list may include a case where entries in the CSI-RS trigger list are the same as each other but an arrangement order of the entries is changed. A case where included entries are the same as each other but the arrangement order of the entries is changed means a case where objects of a measurement result are the same as each other but a quality order of the measurement results is changed.

If it is determined that the CSI-RS trigger list is changed, the UE may report the CSI-RS measurement result satisfying the reporting condition. The UE may report the CSI-RS trigger list to the network together with the CSI-RS measurement result. The UE may update the first CSI-RS trigger list to a second CSI-RS trigger list when reporting the measurement result. Upon post-evaluation/report to be performed later, the UE may compare a new CSI-RS trigger list with the first CSI-RS trigger list.

2. If it is determined that the second CSI-RS trigger list is the same as the first CSI-RS trigger list, the UE may not report a post measurement result. A case where the CSI-RS trigger lists are the same as each other may be a following case.

Example: first CSI-RS trigger list={CSI-RS resource 1, CSI-RS resource 2}
=>second CSI-RS trigger list={CSI-RS resource 1, CSI-RS resource 2}

Referring to the above listed example, a case where the CSI-RS trigger lists are the same as each other may be a case where entries in the CSI-RS trigger list are the same as each other and listed orders of the entries are the same as each other.

When performing CSI-RS measurement/report, the UE may continuously perform an evaluation and a report for a post-report of step S1540. If the transmission number of the CSI-RS measurement result becomes a specific number, the UE may stop evaluation and reporting processes for the post-report. The specific number may be a value which is previously set to the UE or a value set by the network through measurement setting.

Hereinafter, a method for measuring and reporting a CRI-RS measurement according to an embodiment of the present invention will be described in detail with reference to the accompanying drawings.

Figure 17:
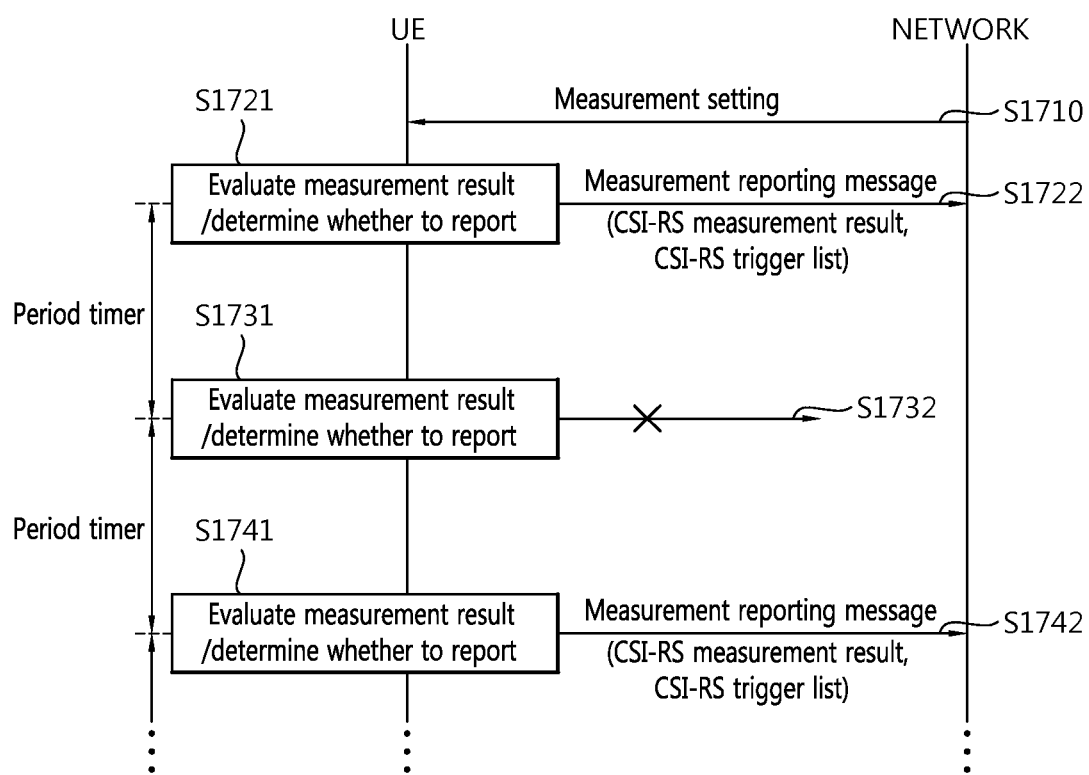
FIG. 17 is a diagram illustrating an example of a method for reporting a CSI-RS measurement according to an embodiment of the present invention.

FIG. 17 is a diagram illustrating an example of a method for reporting a CSI-RS measurement according to an embodiment of the present invention.

Referring to FIG. 17, the UE receives measurement setting for measuring and reporting the CSI-RS from the network (S1710). The measuring setting may include a measurement object for measuring and reporting a CSI-RS, a measurement identifier, and/or information on reporting setting. The reporting setting may indicate that whether to satisfy the reporting condition of the CSI-RS measurement result is determined based on an event. Accordingly, the reporting setting may specify each event associated with the reporting condition.

In addition, the measurement setting may indicate that the UE performs the reporting determination every period. To this end, the UE may add a specific period to measurement setting to provide the measurement setting to the network.

The UE may perform a measurement to obtain a CSI-RS measurement result. The UE evaluates a CSI-RS measurement result to determine whether to report the CSI-RS measurement result (S1721). If the CSI-RS measurement result satisfies an event based reporting condition provided through the measuring setting, the UE may determine to report the measurement result. That is, since determination whether to report is for initial report in step S1721, if at least one obtained CSI-RS measurement result satisfies the reporting condition, the UE may determine to report the measurement result regardless of whether to change the CSI-RS trigger list. In addition, the UE may generate a CSI-RS trigger list which is a CSI-RS resource list associated with the CSI-RS measurement result satisfying the reporting condition.

The UE transmits a measurement reporting message to the network (S1722). The UE may add a CSI-RS measurement result satisfying the reporting condition to the measurement reporting message. Further, the UE may add the CSI-RS trigger list to the CSI-RS measurement result.

The UE may perform an initial report to start a period timer.

The UE may evaluate the measurement result when the period timer is terminated to determine whether to report the measurement result (S1731). Since the evaluation performed in step S1731 is for the purpose of a post-report, the UE may determine to report based on the CSI-RS trigger list.

When presence of the report is determined, the UE may determine whether the obtained CSI-RS measurement result satisfies the reporting condition to generate a CSI-RS trigger list associated with the CSI-RS measurement result satisfying the reporting condition. The UE compares a newly generated CSI-RS trigger list with a previous CSI-RS trigger list. When the list is changed, the UE may determine to report the measurement result.

When the list is not changed, the UE determines not to report the measurement result and does not transmit a measurement reporting message to the network (S1732). Further, the UE may restart the period timer.

The UE may evaluate a measurement result when the period timer is terminated to determine whether to report the evaluated measurement result (S1741). Since the determination whether to report performed in step S1741 is for the purpose of a post-report, the UE may determine whether to report based on the CSI-RS trigger list.

When presence of the report is determined, the UE may determine whether the obtained CSI-RS measurement result satisfies the reporting condition to generate a CSI-RS trigger list associated with the CSI-RS measurement result satisfying the reporting condition. The UE compares a newly generated CSI-RS trigger list with a previous CSI-RS trigger list. When the list is changed, the UE may determine to report the measurement result.

When the list is changed, the UE determines to report the measurement result and transmits a measurement reporting message to the network (S1742). The UE may add a CSI-RS measurement result satisfying the reporting condition to a measurement reporting message. Further, the UE may add a new CSI-RS trigger list to the CSI-RS measurement result. The UE may update an existing CSI-RS trigger list as the new CSI-RS trigger list. Next, when it is determined whether to report for a post-report by the UE, the updated CSI-RS trigger list may be compared with a newly generated CSI-RS trigger list.

In an example of FIG. 17, it is determined whether the obtained CSI-RS measurement result satisfies the reporting condition together with acquisition of the CSI-RS measurement result. That is, determination whether to satisfy the reporting condition may be performed independently from when it is determined whether to report based on the CSI-RS trigger list. In this case, the UE may previously know the CSI-RS measurement result satisfying the reporting condition before terminating the period timer, and may be operated based on the CSI-RS measurement result satisfying the reporting condition upon determination of presence of the report.

Figure 18:
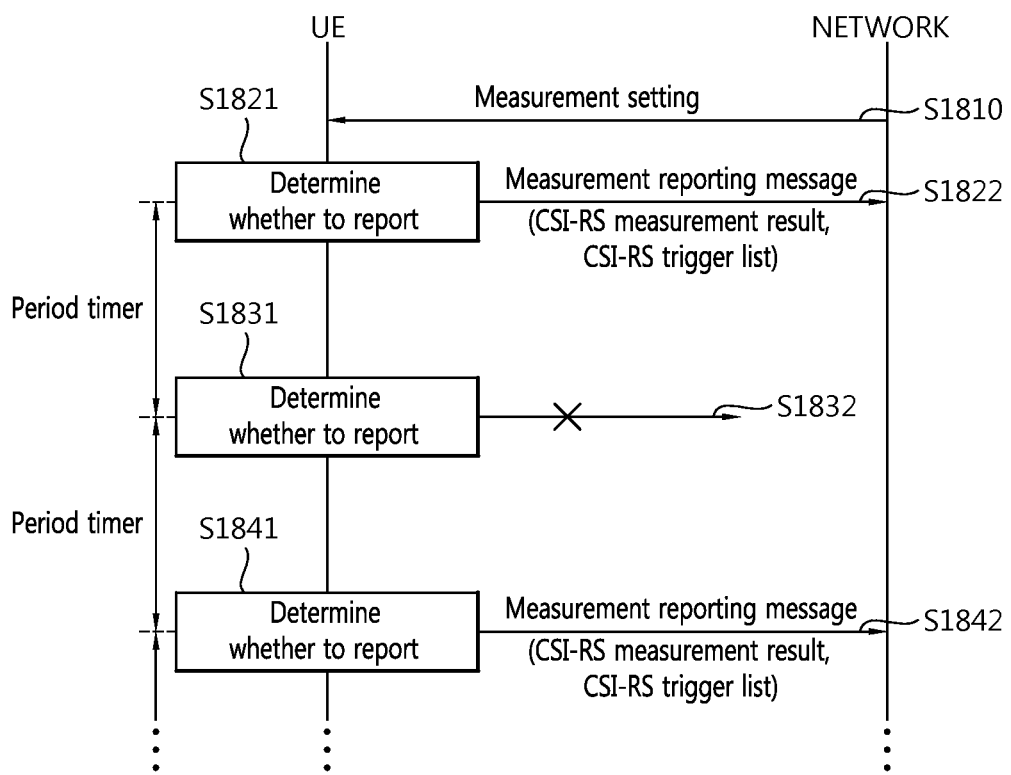
FIG. 18 is a diagram illustrating another example of a method for reporting a CSI-RS measurement according to an embodiment of the present invention.

FIG. 18 is a diagram illustrating another example of a method for reporting a CSI-RS measurement according to an embodiment of the present invention.

Referring to FIG. 18, the UE receives measurement setting for measuring and reporting the CSI-RS from the network (S1810). The measuring setting may include a measurement object for measuring and reporting a CSI-RS, a measurement identifier, and/or information on reporting setting. The reporting setting may indicate that whether to satisfy the reporting condition of the CSI-RS measurement result is determined based on an event.

In addition, the measurement setting may indicate that the UE performs the reporting determination every period. To this end, the UE may add a specific period to measurement setting to provide the measurement setting to the network. A reporting presence determination period of the UE may be set similar to a periodic reporting condition of the CSI-RS measurement result. In this case, the obtained CSI-RS measurement result may be considered to satisfy the reporting condition upon determination of whether to report.

The UE may perform a measurement to obtain a CSI-RS measurement result. When firstly obtaining the CSI-RS measurement result, the UE may determine that a corresponding CSI-RS measurement result satisfied the reporting condition. In this case, the UE determines whether to report for an initial report (S1821). Since step S1821 is evaluation for the purpose of the initial report, the UE may determine to report at least one obtained CSI-RS measurement result regardless of whether the CSI-RS trigger list is changed. The UE may generate a CSI-RS trigger list which is a CSI-RS resource list associated with the CSI-RS measurement result satisfying the reporting condition.

The UE transmits the measurement reporting message to the network (S1822). The UE may add the CSI-RS measurement result satisfying the reporting condition to the measurement reporting message. Further, the UE may add the CSI-RS trigger list to the CSI-RS measurement result.

The UE may perform an initial report to start a period timer.

When the period timer is terminated, the UE may determine whether to report (S1831). Since the determination of whether to report performed in step S1831 is for the purpose of a post-report, the UE may determine whether to report based on the CSI-RS trigger list.

The UE may generate the CSI-RS trigger list associated with the CSI-RS measurement result satisfying the reporting condition at the time of determining whether to report. In this case, the CSI-RS trigger list may include a list of CSI-RS resources with respect to the obtained CSI-RS measurement results. The UE compares a newly generated CSI-RS trigger list with a previous CSI-RS trigger list. When the list is changed, the UE may determine to report the measurement result.

When the list is not changed, the UE determines not to report the measurement result and does not transmit a measurement reporting message to the network (S1832). Further, the UE may restart the period timer.

When the period timer is terminated, the UE may determine whether to report (S1841). Since the determination of whether to report performed in step S1841 is for the purpose of the post-report, the UE may determine whether to report based on the CSI-RS trigger list.

The UE may generate the CSI-RS trigger list associated with the CSI-RS measurement result satisfying the reporting condition at the time of determining whether to report. In this case, the CSI-RS trigger list may include a list of CSI-RS resources with respect to the obtained CSI-RS measurement results. The UE compares a newly generated CSI-RS trigger list with a previous CSI-RS trigger list. When the list is changed, the UE may determine to report the measurement result. The UE compares the newly generated CSI-RS trigger list with the previous CSI-RS trigger list. When the list is not changed, the UE may determine not to report the measurement result.

When the list is changed, the UE determines to report the measurement result and transmits a measurement reporting message to the network (S1842). The UE may add a CSI-RS measurement result satisfying the reporting condition to a measurement reporting message. Further, the UE may add a new CSI-RS trigger list to the CSI-RS measurement result. The UE may update an existing CSI-RS trigger list as the new CSI-RS trigger list. Next, when it is determined whether to report for a post-report by the UE, the updated CSI-RS trigger list may be compared with a newly generated CSI-RS trigger list.

The method for measuring and reporting a CSI-RS according to an embodiment of the present invention allows a UE to report channel state information to a plurality of TPs in an effective way. If necessary, the UE may essentially increase use efficiency of a radio resource by reporting the CSI-RS measurement result to the network. The UE efficiently reports a CRI-RS measurement report so that the network allows the UE to operate a suitable CRI-RS resource, thereby improving an operation performance of the UE.

For example, although a measuring and reporting method according to the embodiment of the present invention describes the method for measuring and reporting the CSI-RS resource, the present invention is not limited thereto. The measuring and reporting method according to the embodiment of the present invention is usably applicable to an RRM measurement. The UE may perform an RRM trigger list based report by obtaining the RRM measurement result, evaluating whether to satisfying the reporting condition, and generating the RRM trigger list. As in the CSI-RS measurement report, if the RRM trigger list is changed, the UE may determine to report the measurement result. If the RRM trigger list is not changed, the UE may determine not to report the measurement result.

Figure 19:
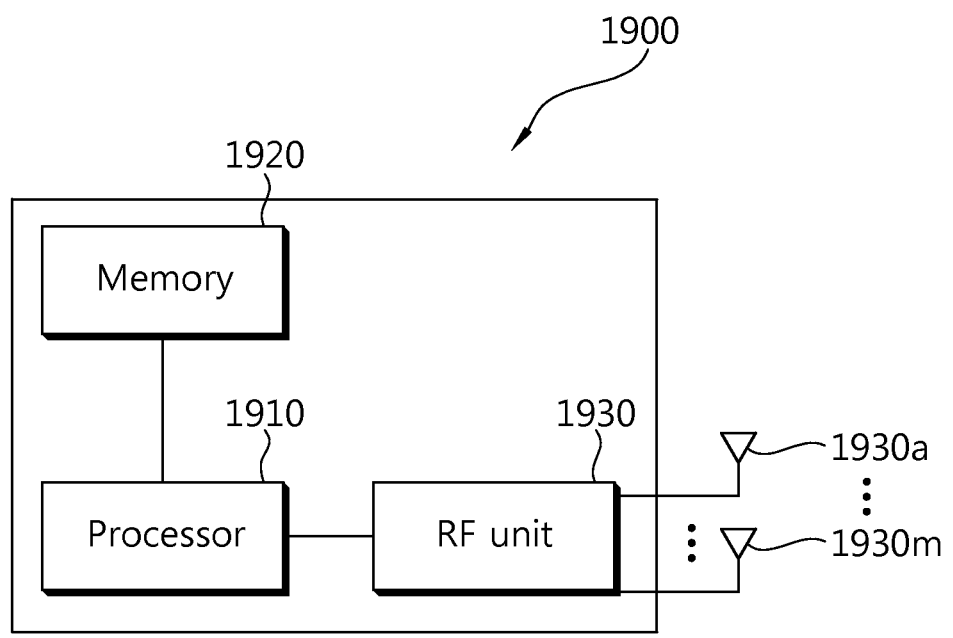
FIG. 19 is a block diagram illustrating a wireless apparatus according to an embodiment of the present invention.

FIG. 19 is a block diagram illustrating a wireless apparatus according to an embodiment of the present invention. The wireless apparatus may implement operation of a terminal and/or a network performing the above embodiment with reference to FIGS. 15 to 18.

Referring to FIG. 19, the wireless apparatus 1900 includes a processor 1910, a memory 1920, and a radio frequency (RF) unit 1930. The processor 1910 performs the proposed functions, processes and/or methods. The processor 1910 may receive allocation of the CSI-RS resource through measurement setting to measure the CSI-RS resource and to evaluate whether to satisfy a reporting condition. The processor 1910 may generate a CSI-RS trigger list based on a CSI-RS measurement result satisfying the reporting condition. The processor 1910 may determine whether to report based on the CSI-RS trigger list and accordingly report the measurement result. The processor 1910 may be configured to implement the embodiment of the present invention with reference to FIGS. 15 to 18.

The RF unit 1930 is connected to the processor 1910, and sends and receives radio signals. The RF unit 1930 may include a plurality of antennas 1930a to 1930m. Each antenna may be implemented to simultaneously transmit and receive to and from another wireless apparatus, a base station, and/or a TP.

The processor 1910 and the RF unit 1930 may be implemented to send and receive radio signals according to one or more communication standards. The RF unit 1930 may include one or more transceivers capable of sending and receiving radio signals.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for measuring and reporting a channel state information-reference signal (CSI-RS) in a wireless communication system, the method comprising:
    transmitting a first measurement report message, which includes at least one first CSI-RS measurement result;
    determining whether to report at least one second CSI-RS measurement result; and
    transmitting a second measurement report message, which includes the at least one second CSI-RS measurement result, when the determination is made to report the at least one second CSI-RS measurement result, wherein the determination of whether to report is based on a first CSI-RS trigger list, which is a list of one or more first CSI-RS resources that are related to the at least one first CSI-RS measurement result, and a second CSI-RS trigger list, which is a list of one or more second CSI-RS resources that are related to the at least one second CSI-RS measurement result, wherein the second CSI-RS trigger list is compared with the first CSI-RS trigger list, and wherein the at least one second CSI-RS measurement result is determined to be reported when the second CSI-RS trigger list is different from the first CSI-RS trigger list.

2. The method of claim 1, further comprising determining that the second CSI-RS trigger list is different from the first CSI-RS trigger list when entries of the second CSI-RS trigger list are different from entries of the first CSI-RS trigger list.

3. The method of claim 2, further comprising determining that the second CSI-RS trigger list is different from the first CSI-RS trigger list when the entries of the first CSI-RS trigger list and the entries of the second CSI-RS trigger list are arranged in a higher order of quality of a measurement result, the entries of the second CSI-RS trigger list are equal to the entries of the first CSI-RS trigger list, and an order of the entries of the second CSI-RS trigger list is different from an order of the entries of the first CSI-RS trigger list.

4. The method of claim 3, wherein the determination of whether to report further comprises determining not to report the at least one second CSI-RS measurement result when the second CSI-RS trigger list is equal to the first CSI-RS trigger list, and wherein the second measurement report message is not transmitted when it is determined that the at least one second CSI-RS measurement result is not reported.

5. The method of claim 4, further comprising determining that the second CSI-RS trigger list is equal to the first CSI-RS trigger list when the entries of the first CSI-RS trigger list are equal to the entries of the second CSI-RS trigger list, and the order of the entries of the second CSI-RS trigger list is equal to the order of the entries of the first CSI-RS trigger list.

6. The method of claim 1, wherein the first measurement report message further comprises the first CSI-RS trigger list.

7. The method of claim 6, wherein the second measurement report message further comprises the second CSI-RS trigger list.

8. The method of claim 1, further comprising starting a period timer when transmitting the first measurement report message, wherein the determination of whether to report is performed when the period timer is terminated.

9. The method of claim 1, further comprising receiving a measurement setting message including setting information for a measurement report from a network, wherein the measurement setting message comprises a reporting setting indicating a reporting condition associated with the at least one first CSI-RS measurement result and the second CSI-RS measurement result, and wherein the reporting setting comprises information indicating whether to report based on the first CSI-RS trigger list and the second CSI-RS trigger list.

10. A wireless apparatus operating in a wireless communication system, the wireless apparatus comprising:

a Radio Frequency (RF) unit configured to send and receive radio signals; and a processor operably coupled to the RF unit and configured to:

transmit a first measurement report message, which includes at least one first CSI-RS measurement result;

determine whether to report at least one second CSI-RS measurement result; and transmit a second measurement report message, which includes the at least one second CSI-RS measurement result, when the determination is made to report the at least one second CSI-RS measurement result, wherein the determination of whether to report is based on a first CSI-RS trigger list, which is a list of one or more first CSI-RS resources that are related to the at least one first CSI-RS measurement result, and a second CSI-RS trigger list, which is a list of one or more second CSI-RS resources that are related to the at least one second CSI-RS measurement result, wherein the second CSI-RS trigger list is compared with the first CSI-RS trigger list, and wherein the at least one second CSI-RS measurement result is determined to be reported when the second CSI-RS trigger list is different from the first CSI-RS trigger list.

11. The wireless apparatus of claim 10, wherein the processor determines that the second CSI-RS trigger list is different from the first CSI-RS trigger list when entries of the second CSI-RS trigger list are different from entries of the first CSI-RS trigger list.

12. The wireless apparatus of claim 11, wherein the processor determines that the second CSI-RS trigger list is different from the first CSI-RS trigger list when the entries of the first CSI-RS trigger list and the entries of the second CSI-RS trigger list are arranged in a higher order of quality of a measurement result, the entries of the second CSI-RS trigger list are equal to the entries of the first CSI-RS trigger list, and an order of the entries of the second CSI-RS trigger list is different from an order of the entries of the first CSI-RS trigger list.

13. The wireless apparatus of claim 12, wherein the determination of whether to report further comprises determining not to report the at least one second CSI-RS measurement result when the second CSI-RS trigger list is equal to the first CSI-RS trigger list, and wherein the second measurement report message is not transmitted when it is determined that the at least one second CSI-RS measurement result is not reported.

14. The wireless apparatus of claim 13, wherein the processor determines that the second CSI-RS trigger list is equal to the first CSI-RS trigger list when the entries of the first CSI-RS trigger list are equal to the entries of the second CSI-RS trigger list, and the order of the entries of the second CSI-RS trigger list is equal to the order of the entries of the first CSI-RS trigger list.

15. The wireless apparatus of claim 10, wherein the first measurement report message further comprises the first CSI-RS trigger list.

16. The wireless apparatus of claim 15, wherein the second measurement report message further comprises the second CSI-RS trigger list.

17. The wireless apparatus of claim 10, wherein the processor starts a period timer when transmitting the first measurement report message, wherein the determination of whether to report is performed when the period timer is terminated.

18. The wireless apparatus of claim 10, wherein the processor receives a measurement setting message including setting information for a measurement report from a network, wherein the measurement setting message comprises a reporting setting indicating a reporting condition associated with the at least one first CSI-RS measurement result and the second CSI-RS measurement result, and wherein the reporting setting comprises information indicating whether to report based on the first CSI-RS trigger list and the second CSI-RS trigger list.

\* \* \* \* \*